United States Patent [19]

Robeson et al.

[11] Patent Number: 5,342,894

[45] Date of Patent: Aug. 30, 1994

[54] GRAFT POLYMERS OF ε-CAPROLACTAM

[75] Inventors: Lloyd M. Robeson, Macungie; Robert K. Pinschmidt, Jr., Allentown; Dilip R. Abayasekara, Catasauqua, all of Pa.

[73] Assignee: Air Products and Chemicals, Inc., Allentown, Pa.

[21] Appl. No.: 852,366

[22] Filed: Mar. 13, 1992

Related U.S. Application Data

[63] Continuation of Ser. No. 463,714, Jan. 11, 1990, abandoned.

[51] Int. Cl.$^5$ ............................................... C08L 77/00
[52] U.S. Cl. ...................................... 525/183; 525/178
[58] Field of Search ......................................... 525/183

[56] References Cited

U.S. PATENT DOCUMENTS

| | | | |
|---|---|---|---|
| 3,984,497 | 10/1976 | Owens et al. | 260/879 |
| 4,018,733 | 4/1977 | Topez et al. | 260/27 EV |
| 4,035,438 | 7/1977 | Neilinger et al. | 260/857 |
| 4,132,690 | 1/1979 | Ernstman et al. | 260/23 AR |
| 4,160,790 | 7/1979 | Mason et al. | 525/179 |
| 4,247,665 | 1/1981 | Daniels et al. | 525/421 |
| 4,310,638 | 1/1982 | Coran et al. | 525/183 |
| 4,374,231 | 2/1983 | Doucet | 525/179 |
| 4,404,325 | 9/1983 | Mason et al. | 525/179 |
| 4,769,285 | 9/1988 | Rasmussen | 428/355 |

*Primary Examiner*—Ana L. Carrillo
*Attorney, Agent, or Firm*—Mary E. Bongiorno; James C. Simmons; William F. Marsh

[57] ABSTRACT

Graft copolymers of ε-caprolactam are made by a process in which ε-caprolactam is polymerized in the presence of a copolymer of an aliphatic acrylate and an ethylenically unsaturated carboxylic acid, such as n-butylacrylate and acrylic acid. Such grafted polymers which have nylon-6 side chains grafted onto the acrylate polymer backbone are useful as hot melt adhesives. In the process for preparing these polymers, the backbone polymer is formed initially by solution polymerization at a moderate temperature and the ε-caprolactam is then added and the temperature increased in the presence of an acidic catalyst. ε-Caprolactam can be used as the solvent in the polymerization of the backbone polymer.

5 Claims, No Drawings

GRAFT POLYMERS OF ε-CAPROLACTAM

This is a continuation of application Ser. No. 07/463,714 filed 11, Jan. 1990, now abandoned.

TECHNICAL FIELD

This invention relates to graft polymers of ε-caprolactam in which the ε-caprolactam units are polymerized onto a backbone of a copolymer of an acrylate with an ethylenically unsaturated carboxylic acid. In another aspect, it relates to hot melt adhesive compositions containing such graft polymers. In still another aspect, it relates to a cationic polymerization method for reacting ε-caprolactam with a copolymer of an acrylate and an unsaturated carboxylic acid.

BACKGROUND OF THE INVENTION

Blending polymers of widely different properties offers a convenient method of arriving at new compositions which provide a unique set of properties tailored for specific applications. For example, copolymers of acrylates and acrylic acid have good low temperature flexibility and general adhesive characteristics, but for many applications, such as in a hot melt adhesive, a higher melting point, as is frequently found in crystalline polymers, is desirable. Generally, however, blends of acrylate-acrylic acid copolymers are not miscible with crystalline polymers which have melting points in the range desired for hot melt adhesives. Preparation of such blends usually leads to poor mechanical compatibility or gross phase separation, which is to be expected with immiscible polymer blends.

Attempts have been made to solve this problem of immiscibility by promoting some chemical bonding between the blended polymers. For example, U.S. Pat. No. 3,984,497 Owens et al (1976) discloses forming a multi-phase emulsion polymerized polymer having an elastomeric phase, such as a butadiene-styrene copolymer, and a rigid phase containing amine-reactive carboxylic groups, such as a copolymer of an alkyl methacrylate and acrylic or methacrylic acid. Such acrylic elastomer-based interpolymers are blended and extruded with a polycarbonamide, such as nylon 6, to improve impact strength of the latter. It is stated that the amine-reactive groups of the multi-phase polymer graft to the polycarbonamide by reacting with an amine end group of the latter. The polycarbonamide is thus modified to render it extrudable, blow moldable and injection moldable.

U.S. Pat. No. 4,035,438, Niellnger, et al. (1977), discloses impact resistant polymer mixtures of polyethylene, poly-ε-caprolactam and a graft polymer having an ethylene/(meth)acrylic acid substrate carrying graft polymerized units of ε-caprolactam. U.S. Pat. No. 4,160,790, Mason, et al. (1979), discloses improving the impact strength of nylon 6 or 66 by melt-blending the nylon with both an ethylene/acrylic acid copolymer and an ethylene/ethyl acrylate copolymer.

U.S. Pat. No. 4,247,665, Daniels, et al. (1981), discloses molding compositions of an aliphatic polyamide, such as nylon 6, 66 or 11, modified with a copolymer made by blending nylon 6 with an acrylic multi-phase polymer having an elastomeric phase and a rigid phase and derived from acrylonitrile or an alkyl (meth)acrylate and a copolymerizable unsaturated carboxylic acid. The modifier polymer is prepared so that some of the carboxylic acid groups of the acrylic polymer react with some of the amine end groups of the nylon 6.

U.S. Pat. No. 4,404,325, Mason, et al. (1983), discloses high impact resistant nylon made by dry blending and melt extruding nylon e.g., poly(ε-caprolactam), a copolymer of ethylene and a methyl or ethyl acrylate ester, and an ionic copolymer, such as a copolymer of ethylene and an unsaturated carboxylic acid, such as acrylic acid.

On the other hand, others have attempted to reduce the chemical interaction between blended polymers by neutralizing interactive groups. For example, U.S. Pat. No. 4,310,638, Coran, et al. (1982), discloses an elastomeric composition of nylon blended with an acrylic copolymer of ethylene, alkyl acrylate and unsaturated carboxylic acid wherein at least 50% of the acid groups in the copolymer are neutralized with metal ions before blending with the nylon. Magnesium oxide is given as a suitable neutralizing agent.

Hot melt adhesives is one area where the potential of polymer blends has offered the possibility of property improvements. Hot melt adhesives based on polyamides are thermoplastics formed by the reaction of dicarboxylic acids with diamines. The dicarboxylic acids used in these polyamides are unsaturated fatty acids often referred to as dimer acids, which consist of mixtures of high molecular weight (for example, 30 to 40 carbon atoms per molecule) based dicarboxylic acids usually containing several isomeric dimers along with minor amounts of timers. These dimer acids are condensed with diamines, such as ethylenediamine and hexamethylenediamine. Such products which are available commercially generally have molecular weights in the range of 2,000 to 15,000 and exhibit softening points between 25° C. and 200° C., depending on the structure and molecular weight of the polymer. Such polyamides can be improved for the purpose of use as hot melt adhesives by polymer blending. For example U.S. Pat. No. 4,018,733 Lopez, et al. (1977), discloses a hot melt adhesive formed by mixing a polyamide and an acidic ethylene polymer. The polyamide is made by copolymerizing a diamine and a dibasic acid, and the ethylene polymer is a copolymer of ethylene and an aliphatic ester of an unsaturated mono- or dicarboxylic acid.

U.S. Pat. No. 4,132,690, Eernstman, et al. (1979), discloses that polyamide hot melt adhesives are improved in adhesive properties by blending with a copolymer of ethylene and an unsaturated carboxylic acid having an acid number of at least 100 and a molecular weight of 500 to 5,000.

It is usual in forming hot melt adhesives with polyamides to specify a particular type of polyamide in order to solve compatibility problems and achieve a sufficiently low molecular weight. For example, U.S. Pat. No. 4,374,231, Doucet (1983), describes a hot melt adhesive of polyamide blended with a terpolymer of ethylene, acrylic acid and an alkyl acrylate. The polyamides are based on one or more dimeric fatty acids and have ring-and-ball softening points preferably of 70°–135° C.

More recently, it has been disclosed that polyamides have found utility in pressure sensitive adhesives. For example, U.S. Pat. No. 4,769,285, Rasmussen (1988), describes a pressure sensitive adhesive formed by solution blending a polyamide with an acrylic polymer, such as a copolymer of isooctyl acrylate and acrylic acid.

Although it has been known for almost two decades that ε-caprolactam could be grafted to a polyethylene-acrylic acid copolymer; for example, see Matzner, et al., *Polym. Sci. & Technol.*, Vol. 6, page 134 (1972), this approach has not been used in modifying the properties of polymers for hot melt adhesives. Matzner, et al. disclose simply the preparation of an ethylene/acrylic acid/nylon 6 graft terpolymer by heating the mixture of the ϵ-caprolactam and the copolymer. Low molecular weight ethylene-acrylic acid copolymers are used for hot melt adhesives, but the upper temperature limit of utility is generally 90° C. due to the crystalline melting point of the ethylene sequences.

SUMMARY OF THE INVENTION

We have now found a unique composition which is specifically suited for specialty adhesive applications, including hot melt adhesives. Also the compositions of this invention can be used, at higher molecular weights, as structural adhesives, as an adhesive component such as in a tie layer for multi-component film production and also in applications involving thermoplastic elastomers. These unique compositions are formed by the cationic grafting polymerization of ϵ-caprolactam onto a backbone of a copolymer of an acrylate and an ethylenically unsaturated carboxylic acid, such as acrylic acid. The product is a graft copolymer of nylon 6 on the acrylate copolymer. The specific acrylate-unsaturated carboxylic acid copolymer which is grafted with nylon 6 yields a property balance which is quite useful in applications now served by the polyamide-based hot melt adhesives. Although nylon 6 exhibits too high of a melting point and viscosity to be considered for such applications and the acrylate/unsaturated carboxylic acid copolymers provide a too narrow useful temperature range, the combination of these two polymers in a form of a single graft copolymer prepared by cationic polymerization yields a unique combination of properties satisfying the requirements of such adhesives.

Accordingly, a graft copolymer is provided, having a backbone of a copolymer of one or more aliphatic acrylates and one or more ethylenically unsaturated carboxylic acids, said backbone having grafted thereto ϵ-caprolactam units. Likewise, the invention provides a hot melt adhesive composition comprising a terpolymer having polymerized ϵ-caprolactam units grafted onto a copolymer of one or more aliphatic acrylates and at least one ethylenically unsaturated carboxylic acid.

The method provided by our invention involves making such a terpolymer by copolymerizing an aliphatic acrylate and an ethylenically unsaturated carboxylic acid to form a copolymer and thereafter reacting this copolymer with ϵ-caprolactam in the presence of an acid catalyst. One of the advantages offered by this procedure is to carry out the copolymerization of the acrylate and the unsaturated carboxylic acid in ϵ-caprolactam acting as a solvent for the polymerization. This copolymerization can be conducted at a relatively moderate temperature of about 70° to 140° C. and then the temperature can be increased to about 170° to 240° C., which is sufficient to promote the grafting and polymerization of the ϵ-caprolactam in the presence of a suitable acid catalyst.

DETAILED DESCRIPTION OF THE INVENTION

The cationic polymerization of ϵ-caprolactam in the presence of a copolymer of an acrylate and an ethylenically unsaturated carboxylic acid produces an acrylate/carboxylic acid/nylon 6 terpolymer with significantly reduced melting point compared to homopolymer nylon 6, because of short chain grafting. This reaction can be conducted either by solution polymerization of the acrylate and ethylenically unsaturated carboxylic acid, followed by the addition of the ϵ-caprolactam under cationic polymerization conditions to yield the resultant graft copolymer, or solution polymerization can be carried out using the ϵ-caprolactam as the solvent followed by the cationic grafting polymerization step. Such use of the ϵ-caprolactam as a solvent provides a simplified, low cost synthesis procedure. The products themselves provide a low viscosity and useful adhesion properties which are equal to or better than those of conventional polyamide hot melt adhesives. The properties of this material indicate potential utility as adhesive materials for bonding a diverse variety of substrates, but they are particularly valuable in specialty adhesives known as hot melt adhesives.

Ungrafted copolymers of acrylates and ethylenically unsaturated carboxylic acids, such as acrylic acid, have adhesive properties but these properties are over a limited temperature range and cannot be considered for structural applications where many of the high performance hot melt adhesives are used commercially. Nylon 6, which is the homopolymer of ϵ-caprolactam, cannot usually be employed as a hot melt adhesive because its melting point of about 230° C. is higher than hot melt adhesives typically utilized. Also, the viscosity of commercial nylon 6 is too high for adequate adhesive application and in general the property balance of this polymer would not be suitable for such uses. A polymeric material based on nylon 6 cationically grafted onto, for example, an acrylate/acrylic acid copolymer, allows for correction of the deficiencies of the constituent polymers in adhesive uses, particularly in the high performance area served by hot melt adhesives. Modest grafting, i.e. from about 25 to 40%, produces a useful product, however best results are obtained if extensive grafting, i.e. greater than about 40% is achieved.

The procedure of this invention which uses the ϵ-caprolactam as a solvent for forming the backbone polymer, offers the advantage that the manufacture can be performed in one reactor in a two step process. Control over which monomeric materials are reacting at any time can be exercised by regulating the temperature. For example, initially the polymerization of an acrylate and acrylic acid is carried out at a temperature in the range of about 70° to 140° C. with the monomers dissolved in molten ϵ-caprolactam. After this polymerization is complete forming the copolymer backbone, the temperature of the reaction mixture is increased to a range of about 170° to 240° C. and the polymerization of the ϵ-caprolactam proceeds, generally to form short chain nylon 6 units grafted onto the acrylate/acrylic acid copolymer backbone. The possibility of eliminating extraneous solvents offers a considerable economic advantage. At low molecular weight, the grafted product can be used as a hot melt adhesive, but at higher molecular weights other applications such as structural adhesives, adhesive interliners for multi-component films or as thermoplastic elastomers are possible.

The backbone polymer is a copolymer of an aliphatic acrylate and an ethylenically unsaturated carboxylic acid and is preferably based on acrylate monomers which offer low glass transition temperatures and high molecular weight polymers. Examples of the preferred aliphatic acrylates are the alkyl esters of acrylic or methacrylic acid in which the alkyl group contains from 2 to 8 carbon atoms such as n-butyl acrylate, 2-ethylhexyl acrylate, ethyl acrylate, n-propyl acrylate, n-pentyl acrylate, n-hexyl acrylate, octyl acrylate and the like. Methyl acrylate can be used, but it is less preferred. Also, methacrylates can be employed and are included within the general reference to aliphatic acrylates, specific examples being n-hexyl methacrylate, 2-ethylhexyl methacrylate, octyl methacrylate, and the like. Similar alkyl crotonates are also possible. Although individual aliphatic acrylate monomers will normally be used, it is possible to use mixed acrylates or acrylates plus dialkyl fumarates or dialkyl maleates and up to 40 wt. % of the aliphatic acrylate mixture can be made from acrylates which produce relatively high Tg polymers, for example the (meth)acrylates, such as methyl methacrylate, ethyl methacrylate, n-butyl methacrylate, and the like.

The ethylenically unsaturated carboxylic acid monomer is preferably acrylic acid, but other such monomers such as the mono- and dibasic organic acids having 3 to 6 carbon atoms are suitable. Examples of such acids include methacrylic acid, crotonic acid, maleic acid, fumaric acid, itaconic acid and the like.

Minor amounts of additional monomers can be employed in preparing the acrylate/unsaturated carboxylic acid copolymer, such styrene, acrylonitrile, butadiene, ethylene, vinyl pyrrolidine, vinyl acetate, vinyl stearate, and the like, in order to optimize the properties of the polymer product for specific applications.

The ε-caprolactam is the monomer used for forming the graft polymer, but minor amounts of other lactams such as lauryllactam, or pyrrolidone can be used in copolymerization with the grafted nylon 6 side chains. Also when forming the graft polymer, minor amounts of other monomers can be present such as dicarboxylic acid, for example adipic acid, and other diamines, such as hexamethylene diamine, can be added to modify the properties of the nylon 6 chains, allowing for adjustments in molecular weight as well as in the softening point of the resultant polymer.

The graft copolymer backbone of the acrylate and ethylenically unsaturated carboxylic acid is made so that it contains about 5 to 30 wt. % of the ethylenically unsaturated carboxylic acid units in the polymer molecule. The graft copolymer is polymerized so that it will contain about 25 to 70 wt. % of polymerized ε-caprolactam units.

Various polymerization procedures can be used for production of the desired graft terpolymer. One such procedure is the solution polymerization of the acrylate/carboxylic acid copolymer in an appropriate solvent, such as toluene, by the addition of an initiator and optionally a transfer agent to control molecular weight. After completion of this polymerization, the solvent can be removed by volatilization and this can be done either before or after the ε-caprolactam is added to the polymer mixture. After solvent removal and addition of the ε-caprolactam, the temperature is raised to a range of about 170° to 250° C., to allow for the cationic grafting polymerization. On completion of the grafting polymerization, the resultant product can be used as is or can be extracted, for example, with ether, to remove unreacted ε-caprolactam. Acidic catalysts are used during the cationic polymerization step to promote the grafting reaction. Examples of such catalysts are HCl and amino carboxylic acids such as aminocaproic acid, and the like.

Another preferred procedure is to use the ε-caprolactam as the solvent for the acrylate/unsaturated carboxylic acid copolymer. As explained previously, this offers the advantage of not requiring additional solvents and thereby avoiding their handling and removal from the polymerization mixture by distillation. Other polymerization techniques which are commonly employed for vinyl monomers can be used for the preparation of the backbone copolymer of the aliphatic acrylate and the ethylenically unsaturated carboxylic acid, including emulsion polymerization, suspension polymerization and bulk polymerization. These are well known polymerization procedures and are described by Odian, *Principles of Polymerization*, 2nd Edition (1981). For example, this text describes various methods of polymerization suitable for (meth)acrylate polymers such as bulk polymerization (pages 286–7), solution polymerization (page 287) heterogeneous polymerization (page 287–8) and emulsion polymerization (pages 319–337).

As is typical with hot melt adhesives, various additives can be incorporated in the compositions of this invention, such as plasticizers which are commonly used with PVC, e.g., di-octyl phthalate, triphenyl phosphate, adipates based on adipic acid, benzoate esters, and low molecular weight polyesters. Toluenesulfonamides can be added to improve flexibility and lower viscosity. Tackifiers can be employed with the polymer of this invention, for example, resins and various polymeric materials such as natural resins, hydrogenated resins, polyterpenes, polybutenes, glycerol esters of fumaric-modified resins, atactic polypropylene and the like. Other diluents can be added such as paraffin or microcrystalline wax, polyethylene wax, beeswax, mineral oil, hydrocarbon oils, and the like.

Other useful constituents which can be added to the composition of this invention include fillers such as titanium dioxide, zinc oxide, diatomaceous earth, clay, talc, wollastonite, silica and the like. Antioxidants, thermal stabilizers, pigments, dies can also be added. Fibrous materials such as fiberglass can be added to improve creep and load bearing properties. Blends with other polymers can be considered for modification of the composition of this invention. Ethylene-acrylic acid copolymers and other acrylic acid copolymers can be added to the acrylate-acrylic acid copolymer prior to the cationic grafting of ε-caprolactam or can be added after the cationic grafting as a blend additive. Other ethylene copolymers of interest include ethylene/vinyl acetate, ethylene/ethyl acrylate, ethylene/methyl acrylate copolymers. Various polyamides can be added or mixed with the compositions of this Invention either during the polymerization or after completion of the polymerization. The polyamides include nylon 6, nylon 11, nylon 12, nylon 6,6, nylon 6,10, nylon 12,12 and various polyamides known in the art as hot melt adhesives as described earlier in this specification.

In order to describe our invention further, the following examples are presented which are meant to be illustrative only and not to limit our invention unduly.

EXAMPLE 1

Poly(n-butylacrylate-co-acrylic acid) containing 15–20 weight percent acrylic acid was prepared as follows.

The reaction was performed in a 500 mL three-necked round bottomed flask equipped with a stirrer, condenser, nitrogen inlet and thermometer. N-butyl acrylate (41.0 g, 0.32 mol) and acrylic acid (9.0 g, 0.125 mol) were mixed in a flask; this constituted the monomer solution. Toluene (8.0 g) and t-butyl peroctoate (0.5 g) were mixed in a second flask; this constituted the initiator solution. The reactor was charged with 8.7 g of toluene, 5.0 g of the monomer solution, and five drops of the initiator solution. The remaining 45.0 g of the monomer solution was transferred to a graduated dropping funnel which was connected to a FMI pump. The remainder of the initiator solution was transferred to a syringe which was mounted on a syringe pump. Then the solutions in the reactor and in the dropping funnel were sparged with nitrogen for 1 hour. After sparging with nitrogen was complete, the contents of the flask were heated to 70° C. The monomer solution (in the dropping funnel) and the Initiator solution (in the syringe) were added Into the reactor over a period of 3 hours using the FMI pump and the syringe pump, respectively. After this delayed feed was completed, stirring and heating at 70° C. was continued for another 17 hours, resulting in a total reaction time of 20 hours. At this time it was verified by gas chromatographic analysis that the unreacted n-butyl acrylate monomer content In the tacky reaction product was <0.5 wt %. In the few instances where the n-butyl acrylate content was above this level, a small amount of t-butyl peroctoate Initiator (~0.03% by wt of monomer) was added to the reactor and heating at 70° C. was continued for another 2–3 hours, whereupon the n-butyl acrylate content was found to be (0.05%.

The gummy copolymer was then poured out into a tared teflon dish which was placed In a vacuum oven and dried at 60° C. at 250 mm Hg. When a constant weight had been reached (usually after 2–4 days) the material had the appearance of a very viscous or hard, yellow colored glue. $^1H$ and $^{13}C$ NHR analysis of samples of three such polymerization reactions indicated that they contained 15.8 wt % acrylic acid (25 mol %); 17.2 wt % acrylic acid (27 mol %); and 20.2 wt % acrylic acid (31 mol %), respectively.

EXAMPLE 2

Poly(2-ethylhexyl acrylate-co-acrylic acid) containing 15 weight percent acrylic acid was prepared as follows.

2-Ethylhexyl acrylate (2-EHA) (129.0 g, 0.70 mol) and acrylic acid (21.0 g, 0.2914 moll) were mixed in a flask (the monomer solution). 60/40 Toluene/n-BuOH (8.0 g) and t-butyl peroctoate (1.5 g) were mixed in a second flask (the initiator solution). To the reactor, a 500 mL 3-necked round bottomed flask equipped with a mechanical stirrer, a reflux column, a thermometer and a nitrogen inlet, were added 15.0 g of the monomer solution (10% of the monomer solution), 42 g of the solvent (a 60/40 solution of toluene/n-butanol) and 5 drops of the initiator soln. The remaining 90% of the monomer solution was transferred to a graduated dropping funnel which was connected to a FMI pump. The remainder of the initiator solution was transferred to a syringe which was mounted on a syringe pump. Then the solutions in the reactor and in the dropping funnel were sparged with nitrogen for 1 hour. After sparging was completed, the reactor was heated to 70° C. via a temperature regulator and an oil bath. The monomer solution (In the dropping funnel) and the initiator solution (in the syringe) were added into the reactor over a period of 3 hours by the FMI pump and the syringe pump respectively. After the delay feeds were completed, stirring and heating at 70° C. were continued for another 17 hours, resulting in a total reaction time of 20 hours.

At the end of the reaction period, it was verified by gas chromatography that the 2-EHA content in the viscous reaction product was (0.05%. The gummy copolymer was then poured into a tared teflon dish and dried in a vacuum oven at 60° C. and 250 mm Hg. When a constant weight had been reached after ~3 days) the material had the appearance of hard, yellow colored glue. $^1H$ and $^{13}C$ NMR analysis indicated that the 2-EHA/AA copolymer contained 14.8 wt % acrylic acid moieties (31 mol %). Its molecular weight was 174,000 relative to polystyrene standards, as assessed by size exclusion chromatography.

EXAMPLE 3

Uncatalyzed cationic grafting of nylon 6 onto n-butyl acrylate-acrylic acid copolymer was attempted in a typical one-pot synthesis of the graft copolymer as follows:

The "parent" copolymer, poly (n-butyl acrylate-co-acrylic acid) which was synthesized as outlined in Example 1, was left in the 500 ml 3-necked round bottomed flask in which it was prepared. The flask was equipped with a mechanical stirrer, thermometer, nitrogen inlet and a distilling column. The oil bath was substituted with a sand bath. To the n-butyl acrylate-acrylic acid copolymer in the flask (50 g) was added 50 g (0.44 mol) of ε-caprolactam (99%, Aldrich) and 100 ml of toluene (Aldrich). The mixture was heated under nitrogen. The toluene was distilled off at an inside temperature of 110°–120° C. and a distilling temperature of 45°–108° C. within 1 hour.

All of the ε-caprolactam had melted and formed a homogenous phase with the n-butyl acrylate-acrylic acid (nBA-AA) copolymer. At this point, the distilling column was replaced with a reflux column and the temperature was raised to 230° C. (inside temperature). Stirring was continued under nitrogen for ca. 4 hours. Total reaction time was approximately 7 hours. The resulting clear, yellow colored, slightly tacky material was then poured out into a teflon dish, embrittled at −196° C. and broken into chips. Extraction in diethyl ether (in a soxhlet extractor) was done for 24 hours to remove unreacted ε-caprolactam. The polymer was dried at 65° C. and 250 mmHg. The soft, slightly sticky nature of the material indicated that modest grafting of nylon 6 had taken place. Adhesion testing of this product gave promising results (see Example 5 below).

EXAMPLE 4 (Comparative)

Uncatalyzed cationic grafting of nylon 6 onto an ethylene-acrylic acid copolymer containing 20 wt % acrylic acid was performed as follows, using a procedure similar to the one described in Example 3. Poly-(ethylene-co-acrylic) acrylic) (50 g) and ε-caprolactam (50 g; 0.44 mol) were reacted in toluene solvent. Within 4.5 hours at 230° C. (9 hours total reaction time) the product was a yellow, very viscous material. When a portion of it was drawn out and cooled, it was a fibrous, tough, non-sticky, nylon-like material. After methanol extraction (to remove unreacted ε-caprolactam), the material analyzed for 8.31% N which indicated 67% nylon 6, i.e., more than twice the nylon 6 content reported by Matzner, et. al. noted supra for a similar procedure. This methanol washed material was then subjected to trifluoroethanol extraction (by soxhlet) to remove nylon 6 homopolymer from the graft copolymer. The dried material then analyzed for 4.52% N, indicating 36.5% nylon 6. This indicated that, of the nylon 6 present at the end of the grafting reaction, 55% was grafted and the remaining 45% was nylon 6 homopolymer. The mechanical properties of this ethylene-graft nylon 6 copolymer confirmed that a significant amount of nylon 6 had been incorporated into the polymer system.

EXAMPLE 5

Nylon 6 grafting was attempted on a 1:1 mixture of n-butyl acrylate-acrylic acid copolymer (containing 13.5 wt % acrylic acid) and ethylene-acrylic acid copolymer (containing 20 wt % acrylic acid). 50 g of each of the above copolymers were mixed and reacted with $\epsilon$-caprolactam (105 g; 0.9199 mols) following the same procedure as was given in Examples 3 and 4. The soft, sticky nature of the end product was indicative of only modest nylon 6 grafting, as was confirmed by nitrogen analysis (39% nylon 6).

EXAMPLE 6

An uncatalyzed grafting reaction without the use of toluene as a solvent was carried out as follows. To the nBA-AA copolymer which was prepared with caprolactam acting as the solvent (no toluene present), 58.3 g (0.51 mols) of caprolactam was added so that the nBA-AA copolymer:caprolactam ratio was 1:1.5. The mixture was heated and stirred under nitrogen similarly to the above mentioned grafting reactions. Due to the very high molecular weight, ($M_w > 1$ million) nBA-AA copolymer wrapped itself around the stirring shaft and contact between the copolymer and the caprolactam was limited. After a total reaction time of 5.5 hours and 3 hours at 220°-240° C., maximum viscosity appeared to have been reached. It thus appears possible to conduct the grafting reaction in $\epsilon$-caprolactam as a solvent, however, the soft, sticky nature of the end product indicated that insufficient nylon 6 grafting had taken place.

EXAMPLE 7

HCl was successfully used to catalyze the grafting reaction. The best results were obtained when HCl at 0.1 mol/mol of $\epsilon$-caprolactam was used. The grafting procedure for this reaction was as follows.

The apparatus was the same as that used for the uncatalyzed grafting procedure given in previous examples. To 50 g of nBA-AA copolymer in a 3-necked round bottomed flask, was added 75 g (0.66 mol) of $\epsilon$-caprolactam (99%, Aldrich) and 100 ml of toluene (Aldrich). Under a nitrogen atmosphere, the mixture was heated until all of the toluene had distilled out. The caprolactam had melted and mixed with the copolymer to form a single phase. After 3 hours of reaction time, at a temperature (inside) of 145° C., 0.6 g of HCl (36.5–38.0 wt % HCl) was injected via a syringe. At 160° C., 1.5 hours later, another 0.6 g of HCl was added while continuing to stir under nitrogen. In order to avoid the immediate loss of HCl by rapid distillation, the distilling column was replaced by a reflux column. A third injection of 0.6 g of HCl was added another hour later at 200° C. A fourth and final injection of 0.6 g of HCl was done another hour later at 230° C. The inside temperature was maintained at 230° C. for 3.5 hours. The total reaction time was 9 hours. At this time, the flask contained an extremely viscous, yellow mixture which was poured into a teflon dish. A sample was removed for physical testing, while the rest was cooled, broken into chips, and subjected to extraction with diethyl ether to remove unreacted $\epsilon$-caprolactam. After drying (65° C., 250 mm, 48 hours), $^{13}$C NMR indicated that nylon 6 grafting had occurred, with a nylon 6 content of 58±4%.

EXAMPLE 8

A similar HCl catalyzed nylon 6 grafting reaction was performed on a nBA-AA copolymer that had been prepared with caprolactam as the solvent. To the nBA-AA copolymer 41.6 g (0.37 mols) of caprolactam was added such that the nBA-AA copolymer:caprolactam ratio was 1:1.5. Similar to the grafting reactions of prior Examples, the mixture was stirred and heated under nitrogen. The caprolactam melted and mixed with the copolymer to form a single phase. After 1 hour of heating, at 140° C. (inside temp.), 0.6 g of HCl was injected. After 80 min. of heating, at an inside temperature of 200° C., the mixture had become more viscous, was a light yellow color, and was building up around the stirring shaft. At this point, a second 0.6 g of HCl was injected into the reaction mixture. Viscosity continued to increase 90 min. into the reaction, at 230° C., whereupon a third 0.6 g of HCl was injected. Two hours into the reaction (still at 230° C.) the mixture was very viscous. A fourth 0.6 g of HCl was injected. At 2.75 h the mixture appeared to be getting less viscous. The temperature was lowered to 210° C. and the reaction was maintained for another 4 hours. After a total reaction time of 6.5 hours, the mixture had lost much of its prior viscosity and was a brown color. The mixture was poured into a teflon dish. A sample was removed for physical testing, while the rest was cooled, broken into chips, and the unreacted $\epsilon$-caprolactam was extracted with diethyl ether After drying (65° C., 250 mm Hg, 48 h), $^{13}$C NMR indicated that nylon 6 grafting had occurred with a nylon 6 content of 51+2%.

EXAMPLE 9

The initiating efficiency of aminocaproic acid for the nylon 6 grafting reaction was examined. The experimental procedure was very similar to that of the uncatalyzed grafting reactions of Examples 3–5 with the exception that 2.15 g (0.016 moll of aminocaproic acid (Aldrich) was added to the nBA-AA copolymer/$\epsilon$-caprolactam mixture. This corresponded to 0.025 mol of aminocaproic acid per mol of $\epsilon$-caprolactam. The resulting brown, soft, non-sticky material was found to have 45±4% nylon 6, as determined by $^{13}$C NMR.

EXAMPLE 10

As an example of adhesion testing, adhesion comparisons of the subject invention materials were made with commercial polyamide hot melt adhesives. The substrate materials chosen for adhesive testing were maple wood and 304 stainless steel. The maplewood and stainless steel samples (dimensions=$4'' \times \frac{3}{4}'' \times 3/16''$) were prepared by placing a $\frac{1}{2}'' \times \frac{3}{4}'' \times 0.020''$ compression molded specimen between the substrates in a lap joint. The joints were held under pressure (30–40 psi for stainless steel; 50–60 psi for maplewood) at 160° C.–190° C. for 8–10 minutes in a circulating air oven. Pressure was relieved after the samples cooled to room temperature. The resultant samples were placed between grips in an Instron testing machine and pulled to failure at an extension rate of 0.1''/min. The adhesive shear strength values of the subject invention materials are compared with the commercial hot melt adhesives in Table 1. The results show similar performance of the materials compared for maplewood adhesion but significantly better performance for the material of the subject invention for stainless steel substrates. The importance of catalyzed grafting is also demonstrated by comparing results for the products of Examples 3 and 7. ASTM D-1002-72 was used as a guide to design the procedures utilized in this test.

TABLE 1

| Material | Adhesive Shear Strength (MPa) | |
|---|---|---|
| | Maplewood Adherends | Stainless Steel Adherends |
| n-BA/AA-g-nylon 6* | 9.7 | 9.0 |
| n-BA/AA-g-nylon 6** | 6.2 | |
| Uni-rez 2622 | 7.3 | 3.7 |
| Uni-rez 2645 | 6.7 | 3.7 |
| Uni-rez 2665 | 9.8 | 1.5 |

*Polymer from Example 7.
**Polymer from Example 3.
Commercial polyamide hot melt adhesive from Union Camp.

EXAMPLE 11

Lap shear test specimens were prepared using Mylar ® poly(ethylene terephthalate) as the substrate. The nylon 6-graft-n-butyl acrylate/acrylic acid copolymer was prepared using the procedure similar to that of Example 7. The lap shear strength and energy to break data are listed in Table 2 below and are compared to two ethylene-acrylic acid copolymers.

TABLE 2

| | Ultimate Lap Shear Strength (psi) | Energy to Break ft. lbs./in$^2$ |
|---|---|---|
| EAA-1430 | 26.8 | 0.23 |
| Primacor-5981 | 28.7 | 0.48 |
| Nylon 6-graft-n-butyl acrylate/acrylic acid copolymer | 43.9 | 1.33 |

EXAMPLE 12

In order to compare the improvement of elevated temperature properties for hot melt adhesives, 4"×4"×0.040" samples of EAA-1430 (ethylene-acrylic acid copolymer; 9% AA, 5 dg/min. melt index) and the nylon 6-graft-n-butyl acrylate/acrylic acid copolymer of example 7 were compression molded. The shear modulus at various temperatures was measured using a dynamic mechanical spectrometer. The data are listed in Table 3 and demonstrate significant modulus improvements over EAA-1430 above 96° C.

TABLE 3

| Temperature | Shear Modulus dynes/cm$^2$ | |
|---|---|---|
| | EAA-1430 | Polymer of Example 7 |
| 40 | $4.58 \times 10^8$ | $1.635 \times 10^8$ |
| 80 | $1.19 \times 10^8$ | $2.364 \times 10^8$ |
| 96 | $1.25 \times 10^7$ | $1.779 \times 10^8$ |
| 106 | * | $1.164 \times 10^8$ |
| 116 | * | $9.60 \times 10^7$ |
| 126 | * | $5.02 \times 10^7$ |
| 131 | * | $3.31 \times 10^7$ |

*Too low to determine

Other aspects and embodiments of our invention will be apparent to those skilled in the art from the above disclosure without departing from the spirit or scope of our invention.

We claim:

1. A graft copolymer consisting essentially of a copolymer backbone of one or more aliphatic acrylates and an ethylenically unsaturated carboxylic acid selected from the group consisting of acrylic and methacrylic acid, and having grafted thereto polymerized ε-caprolactam units, said graft copolymer prepared by reacting said one or more aliphatic acrylates with said ethylenically unsaturated carboxylic acid to form said copolymer backbone and then graft polymerizing ε-caprolactam monomer units to said copolymer to form said graft copolymer.

2. The graft copolymer of claim 1 wherein said copolymer backbone contains 5 to 30 percent of the ethylenically unsaturated carboxylic acid units and said graft copolymer contains 25 to 70 weight percent of polymerized ε-caprolactam units.

3. The graft copolymer of claim 2 wherein said aliphatic acrylates are alkyl esters of acrylic or methacrylic acid in which the alkyl group contains from 2 to 8 carbon atoms.

4. The graft copolymer of claim 3 wherein said acrylate is n-butyl acrylate.

5. The graft copolymer of claim 3 wherein said acrylate is 2-ethylhexyl acrylate.

* * * * *